Patented July 6, 1937

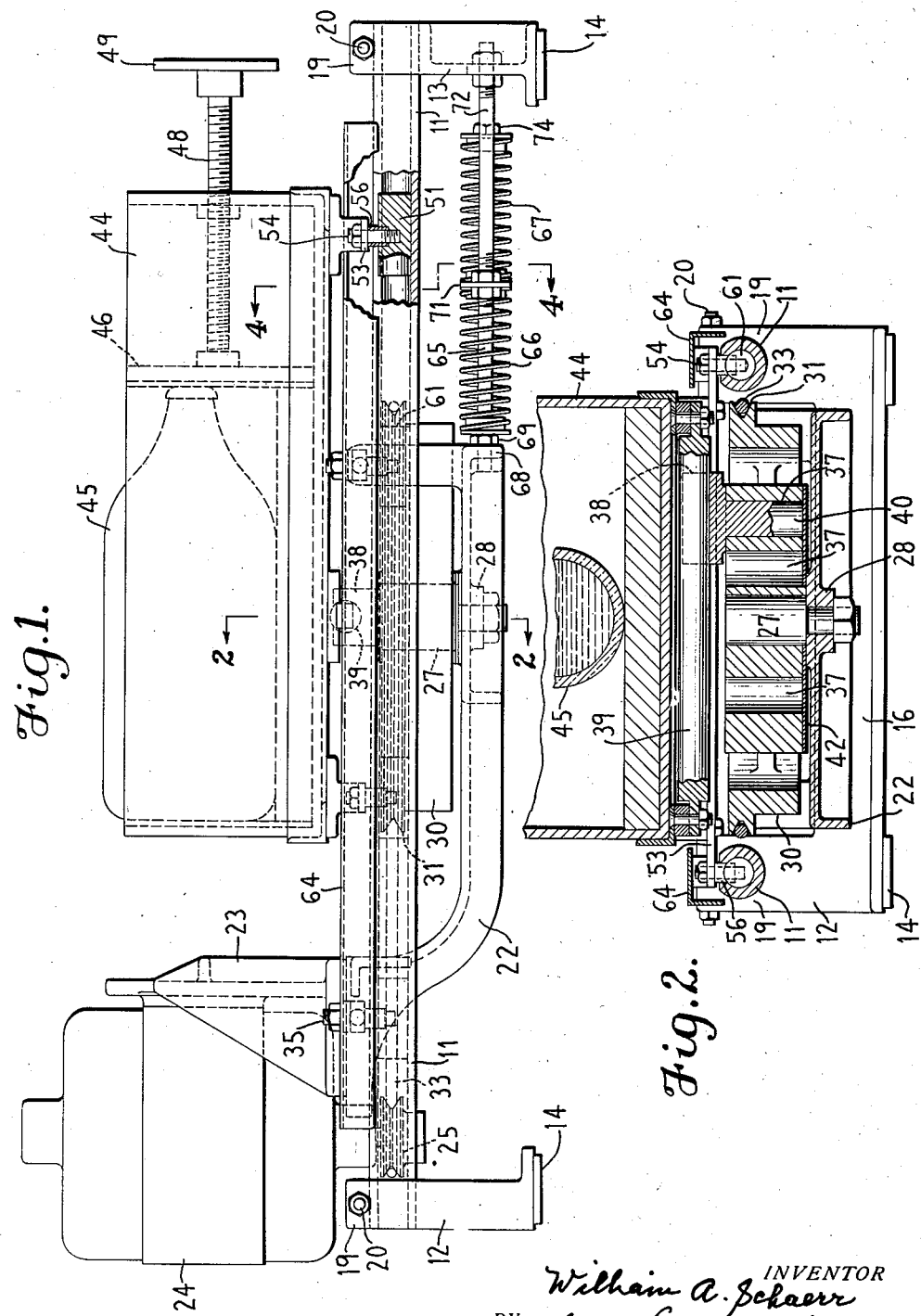

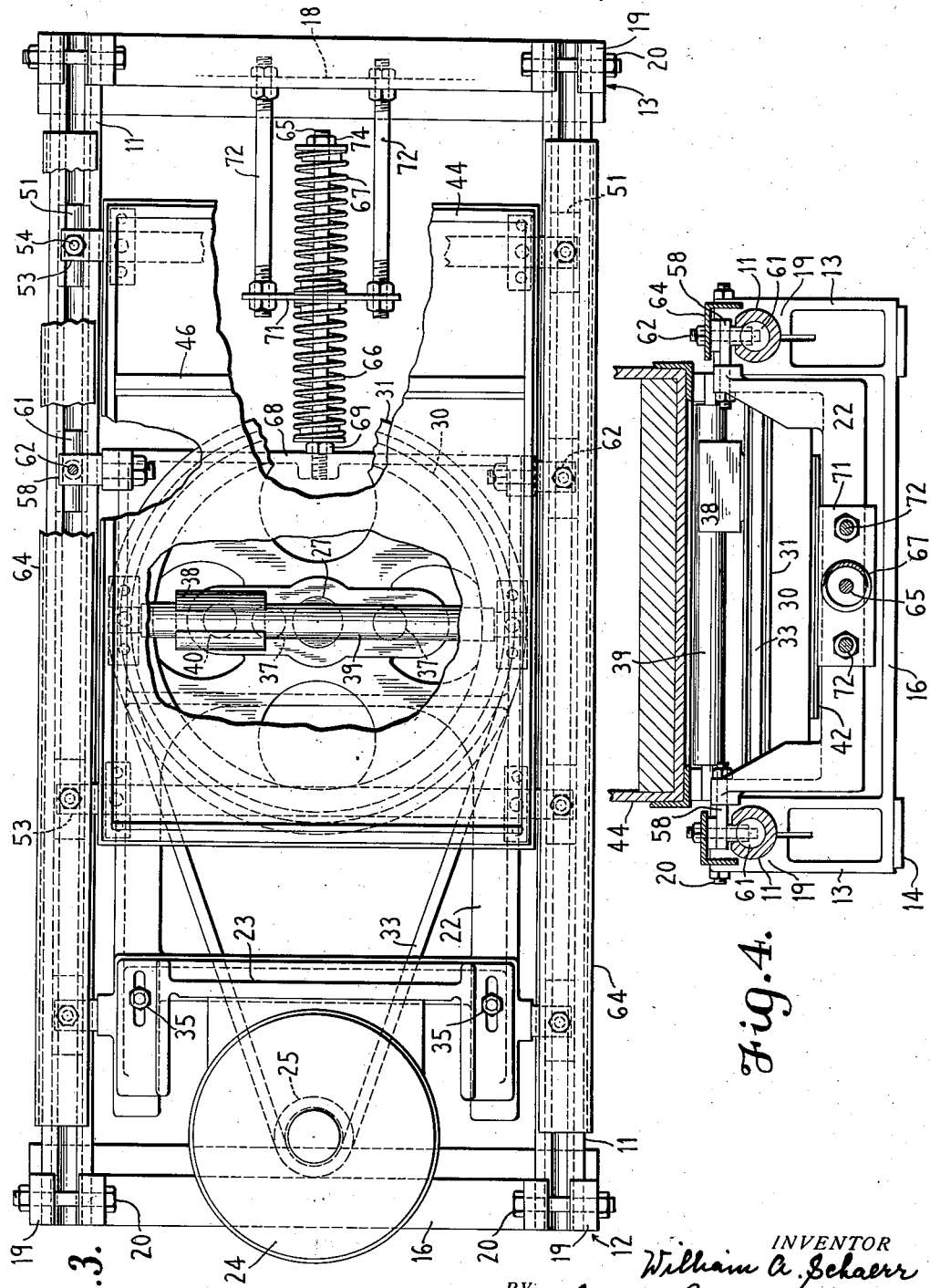

2,086,241

UNITED STATES PATENT OFFICE 2,086,241

LABORATORY SHAKER

William A. Schaerr, Brooklyn, N. Y.

Application February 15, 1936, Serial No. 64,005

8 Claims. (Cl. 259—91)

This invention relates to apparatus for shaking bottles or other vessels in order to mix or agitate their contents. The invention relates more particularly to portable shakers for laboratory use.

In laboratory work the shaking of small or medium-size bottles is tiresome and therefore not likely to be done thoroughly when manual effort alone is relied upon. Large bottles are too heavy to be shaken effectively without the use of some kind of mechanical shaking device.

It is an object of this invention to provide improved shaker apparatus which is economical to manufacture and convenient and advantageous in use.

Another object of the invention is to provide a shaker in which the shock and recoil incident to the shaking are taken up in such a manner that the frame of the machine has no tendency to move and need not be attached to a heavy base or fastened to the table or bench on which it is supported. This feature of the invention is particularly advantageous in a laboratory because it permits the shaker to be easily moved to the most convenient location in the laboratory for the particular work with which the shaker is being used.

In accordance with another feature of the invention the machine is made with an improved construction and relation of bearings which cause quiet operation of the apparatus, even after long use. Some laboratory shakers of the prior are become so noisy after continued use that they are a great annoyance to everybody working in the same room with them.

Other objects, features and advantages of the invention will appear or be pointed out as the specification proceeds.

In the accompanying drawings, forming part hereof:

Fig. 1 is a side elevation, partly broken away and partly in section, showing a shaker made in accordance with the invention;

Fig. 2 is a sectional view taken on the line 2—2 of Fig. 1.

Fig. 3 is a top plan view of the shaker shown in Fig. 1, with part of the carriage broken away to expose the parts below; and Fig. 4 is a sectional view taken on the line 4—4 of Fig. 1.

The stationary frame of the machine comprises two parallel tubes 11 supported at their opposite ends by legs 12 and 13. Feet 14 at the lower end of each leg rest on the table or other surface on which the machine is supported.

The legs 12 are joined by an integral cross-brace 16 (Fig. 2), and the legs 13 at the other end of the machine are integral with a similar cross-brace 18 (Fig. 4). The upper ends of the legs 12 and 13 are split clamps 19, which receive the ends of the tubes 11 and are held closed against the tubes by bolts 20, best shown in Fig. 3.

A movable frame 22 has a bracket 23 at one end supporting a motor 24. The motor shaft is vertical and has a pulley 25 at its lower end, as shown in Fig. 1. An upwardly extending pin 27 is bolted through a boss 28 of the movable frame 22. A fly-wheel 30 rotates on the pin 27 as a bearing. The fly-wheel has a pulley face 31 in alinement with the motor pulley and the fly-wheel is driven from the motor pulley by a belt 33.

The motor supporting bracket 23 is secured to the movable frame 22 by screws 35 (Fig. 3) which extend through slots in the bracket 23 to permit adjustment of the bracket toward and from the fly-wheel to change the tension of the belt 33 or to accommodate the machine to motors of different size.

The hub of the fly-wheel 30 has three holes 37 at different distances from its axis of rotation. A crank block 38 slides on a cross-head rod 39 as a bearing and has a crank pin 40 (Fig. 2) which is inserted in one of the holes 37. The particular hole into which the crank pin 40 is inserted determines the throw of the crank and the resulting travel of the block 38 and the cross-head rod 39.

A bearing plate 42 attached to the under side of the fly-wheel 30 serves as a thrust washer for the fly-wheel. The bearing plate 42 extends under all of the holes 37 and forms the thrust bearing for the pin 40 under each of the holes 37.

The cross-head rod 39 is attached to a carriage 44. This rod and the crank block 38 and pin 40 comprise a sliding block linkage for converting the rotary motion of the fly-wheel into a reciprocating movement of the carriage.

A bottle 45 or other vessel containing the liquid to be shaken rests on the floor of the carriage 44 and is held in position by a movable partition 46 (Fig. 1), which clamps the bottle against one end of the carriage. The partition 46 is held against the end of the bottle by a screw 48 which threads through one end wall of the carriage and has a knob 49 by which it can be turned.

Cylindrical slipper blocks 51, having a diameter substantially equal to the inside diameter of the tubes 11, slide freely in the tubes 11 as bearings. Brackets 53 extending from the sides of the carriage 44 are connected with one of the slipper blocks 51 adjacent each corner of the carriage by screws 54 which extend through the slots in the tubes 11 and thread into the slipper blocks. The brackets 53 are held away from the tubes 11 by sleeves 56 which surround the screws 54, abut against the under sides of the brackets 53, and extend into counterbores in the slipper blocks 51.

The carriage 44 can be supported by wheels running on the tubes 11 or other rails, but the slipper blocks 51 are preferable to wheels because of their greater bearing surfaces and quieter operation. The tubes 11 are the track or guide rails for the carriage, and since the slots in the tubes 11 are narrower than the slipper blocks the carriage can not be knocked off its track either in operation or while being moved from place to place. Oil placed in the tubes 11 stays there and keeps the surfaces constantly lubricated.

The movable frame 22 has extensions 58 (Fig. 4) which overlie the tubes 11 and are connected to slipper blocks 61 similar to the slipper blocks 51 by which the carriage 44 is supported. The extensions 58 are connected with the slipper blocks 51 by stud bolts 62. An angular guard plate 64 is held by the bolts 62. This guard plate extends along most of the length of the tubes 11 and covers the connections of both the carriage 44 and frame 22 with their respective slipper blocks.

Movement of the frame 22 along the tubes 11, which are a part of the stationary frame of the machine, is resisted by springs 66 and 67, best shown in Fig. 3. A rod 65 is screwed into the center of a cross member 68 of the frame 22 and the rod is locked in place by a nut 69.

A spring support 71 is held in a fixed position by bolts 72 connected to the cross brace 18 of the stationary frame. The rod 65 extends through the spring support 71 and has its far end threaded to receive a nut 74. The spring 66 is compressed between the nut 69 and the spring support 71. The spring 67 is compressed between the nut 74 and the spring support 71. Movement of the frame 22 in either direction along the tubes 11, therefore, is resisted by one or the other of the springs 66 and 67.

The shock of stopping the carriage 44 at each end of its stroke, and the reaction from starting the carriage in a reverse direction are transmitted to the frame 22 through the fly-wheel 30. The strength of the springs 66 and 67 is such that they permit the frame 22 to move in response to the shock of stopping the carriage and permit a recoil of the frame 22 incident to the reversal of the carriage. This movement of the frame 22 under the yielding restraint of the springs 66 and 67 absorbs the shocks resulting from the stopping and starting of the carriage so that these shocks are not transmitted to the stationary frame of the machine.

As a result of the shock absorbing and recoil feature of this invention the stationary frame of the machine has no tendency to shift on the table or other surface on which it is supported, and it is not necessary to anchor the machine to a base. The preferred embodiment of the invention has been described, but changes and modifications can be made and some features of the invention can be used without others without departing from the invention as defined in the claims.

I claim:

1. Shaker apparatus comprising a carriage for holding the material to be shaken, a track supporting the carriage and along which the carriage moves, mechanism for causing the carriage to reciprocate to and fro along said track, a movable frame supporting said mechanism, and means holding said frame against movement including resilient means of such a nature that they yield under the force of the recoil of said mechanism in both directions as said mechanism reverses the direction of movement of the carriage.

2. A laboratory apparatus for shaking bottles or the like including a supporting frame adapted to rest on a table or other supporting surface, a bottle-holder supported from the frame, and movable back and forth on the frame with all or a substantial component of said movement in a horizontal direction, mechanism for imparting such movements to the bottle-holder to agitate the contents of a bottle in said holder, and means movably supporting said mechanism for shifting movement in a direction opposite to the movement of the bottle-holder to absorb the forces of shock and recoil incident to the movement of said bottle-holder so that the supporting frame remains in a given location and has no tendency to shift on the table or other supporting surface.

3. Shaker apparatus comprising a carriage for holding a bottle or other vessel to be shaken, a supporting frame including a track along which the carriage moves, mechanism for causing the carriage to reciprocate to and fro along said track, a second frame supported by and movable on said supporting frame, mechanism on the second frame for moving the carriage back and forth along the track, and resilient means holding the second frame against movement with respect to said supporting frame but constructed and arranged to yield in response to the recoil resulting from each reversal of the carriage movement so that the force of said recoils does not tend to shift the supporting frame on the table or other surface on which it rests.

4. A machine for shaking bottles or the like including in combination a supporting frame on which is a track, a carriage movable along the track, a second frame supported by and movable along the track, mechanism carried by the second frame and operable to cause relative movement of the second frame and carriage, and springs associated with the second frame in a relation to resist movement of said second frame along the track.

5. Shaker apparatus comprising a carriage for holding a bottle or other vessel to be shaken, bearing means supporting the carriage, mechanism for moving the carriage back and forth on said bearing means including a rotary electric motor and motion transmitting connections between the motor and said carriage including crank means for converting rotary movement of the motor into reciprocating movement of the carriage, a movable frame supporting the motor and crank means, and resilient means resisting movement of the motor-supporting frame but yieldable in response to the recoil resulting from the reversals of the direction of movement of the carriage.

6. A machine for shaking bottles or the like, including a supporting frame, a track on the supporting frame, a carriage movable along the track, a second frame movable along the track, a bracket on the second frame for holding an electric motor, crank means carried by the second frame and connected with the carriage for causing relative movement of the second frame and carriage, motion transmitting means carried by said second frame and operatably connecting the motor with said crank means, and springs holding the second frame against movement along the track.

7. A machine for shaking bottles or the like, including a supporting frame, a track on the supporting frame, a carriage movable along the track, a second frame movable along the track, a bracket on the second frame for holding an electric motor, a fly-wheel supported for rotation about a bearing on the second frame, means for driving the fly-wheel from a motor in said bracket, a sliding block linkage through which the fly-wheel imparts a reciprocating movement to the carriage, and springs holding the second carriage against movement along the track.

8. Shaker apparatus comprising a carriage for holding a bottle or other vessel to be shaken, a supporting frame including two parallel slotted tubes, slipper blocks fitting in said tubes and movable lengthwise in said tubes as bearings, connections extending through the slots in the tubes and joining the carriage with certain of said slipper blocks so that the carriage is supported by the tubes and movable along them as guide rails, a second frame, connections extending through the slots and joining the second frame with others of said slipper blocks so that the second frame is movable along the tubes as guide rails, an electric motor and motion transmitting mechanism carried by the second frame, said motion transmitting mechanism including a sliding block linkage connected with the carriage, and springs tensioned between the supporting frame and second frame for resisting movement of the second frame on the supporting frame, said springs being of such strength that they yield in response to the shock and recoil caused by the movement of the carriage and its operating mechanism.

WILLIAM A. SCHAERR.